(12) United States Patent
Horiuchi et al.

(10) Patent No.: US 10,655,488 B2
(45) Date of Patent: May 19, 2020

(54) GAS TURBINE TRANSITION SEAL WITH HOLE THROUGH SEAL PLATE IN GROOVE OF NOZZLE

(71) Applicant: Mitsubishi Hitachi Power Systems, Ltd., Nishi-ku, Yokohama (JP)

(72) Inventors: Yasuhiro Horiuchi, Yokohama (JP); Shinichi Higuchi, Yokohama (JP); Hisato Tagawa, Yokohama (JP); Kenji Shingai, Yokohama (JP); Takemitsu Miura, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 217 days.

(21) Appl. No.: 15/678,805

(22) Filed: Aug. 16, 2017

(65) Prior Publication Data

US 2018/0058234 A1    Mar. 1, 2018

(30) Foreign Application Priority Data

Aug. 25, 2016  (JP) .................................. 2016-165023

(51) Int. Cl.
  *F01D 11/00*  (2006.01)
  *F01D 9/02*  (2006.01)
  *F02C 7/28*  (2006.01)

(52) U.S. Cl.
  CPC ............ *F01D 11/005* (2013.01); *F01D 9/023* (2013.01); *F02C 7/28* (2013.01); *F05D 2220/32* (2013.01); *F05D 2240/55* (2013.01)

(58) Field of Classification Search
  CPC .... F01D 9/023; F01D 11/005; F05D 2240/55; F05D 2240/56; F05D 2240/57; F23R 3/002; F23R 2900/00012
  See application file for complete search history.

(56) References Cited

U.S. PATENT DOCUMENTS 4,422,288 A * 12/1983 Steber ..................... F01D 9/023
                                                       60/39.37
2009/0317286 A1* 12/2009 Nishi ...................... C22C 19/07
                                                       420/440

(Continued)

FOREIGN PATENT DOCUMENTS

EP    1 035 377 A2    9/2000
EP    2 626 600 A2    8/2013

(Continued)

OTHER PUBLICATIONS

Korean-language Office Action issued in counterpart Korean Application No. 10-2017-0084610 dated Jul. 16, 2018 (four (4) pages).

(Continued)

*Primary Examiner* — Scott J Walthour
*Assistant Examiner* — Todd N Jordan
(74) *Attorney, Agent, or Firm* — Crowell & Moring LLP

(57) ABSTRACT

In a gas turbine in which a seal member seals a gap between a transition piece and a nozzle end wall in a turbine first stage, the transition piece and the nozzle end wall has a seal groove. The seal member includes a hook portion that slides in the turbine radial direction with respect to the flange and a seal plate portion inserted in the groove. The groove and the portion are configured to include a surface contact region in which a surface of the groove and the portion are in surface contact with each other, a non-contact region disposed on a side closer to the transition piece than the region, and a hole provided at the portion so as to face the surface in the groove across a gap in the region.

11 Claims, 5 Drawing Sheets

(56) References Cited

U.S. PATENT DOCUMENTS

| | | |
|---|---|---|
| 2013/0028713 A1 | 1/2013 | Giri et al. |
| 2013/0227964 A1 | 9/2013 | Willis et al. |
| 2013/0247580 A1 | 9/2013 | Morgan et al. |
| 2014/0023489 A1 | 1/2014 | Fujimoto et al. |
| 2014/0093353 A1 | 4/2014 | Sezer et al. |

FOREIGN PATENT DOCUMENTS

| | | |
|---|---|---|
| JP | 10-184310 A | 7/1998 |
| JP | 2006-214671 A | 8/2006 |
| JP | 2013-104304 A | 5/2013 |
| JP | 2013-181749 A | 9/2013 |
| JP | 2013-194734 A | 9/2013 |
| JP | 2013-221455 A | 10/2013 |
| JP | 2014-74406 A | 4/2014 |

OTHER PUBLICATIONS

Extended European Search Report issued in counterpart European Application No. 17184766.8 dated Jan. 2, 2018 (seven (7) pages).
Japanese-language Office Action issued in counterpart Japanese Application No. 2016-165023 dated Sep. 3, 2019 with English translation (nine (9) pages).

* cited by examiner

GAS TURBINE TRANSITION SEAL WITH HOLE THROUGH SEAL PLATE IN GROOVE OF NOZZLE

BACKGROUND OF THE INVENTION

1. Field of the Invention

The present invention relates to a gas turbine.

2. Description of the Related Art

A gas turbine is configured to be driven by combustion gas generated as a working fluid at high temperature by burning using a combustor compressed air compressed by a compressor together with fuel. Components that are exposed to the turbine combustion gas at high temperature are thus required to be cooled as appropriate using as cooling air a low temperature fluid that has a temperature lower than a temperature of the combustion gas in order to prevent cracking or erosion from occurring as caused by oxidation or thermal stress. Additionally, the turbine and other components very often incorporate a split structure with the aim of facilitating maintenance service and replacement procedures, in addition to reducing stress concentration caused by thermal deformation. To prevent the combustion gas from entering a gap between components from a combustion gas flow passage, a low temperature fluid needs to be supplied to the gap between components as seal air under high pressure from an outside of the combustion gas flow passage. The low temperature fluid to be supplied to the turbine as the cooling air or seal air is typically extracted from the compressor. Thus, excessively increasing the amount of fluid to be extracted reduces the flow rate of the combustion gas for driving the turbine, resulting in reduced overall efficiency of the gas turbine. Thus, a seal plate is disposed across the gap between turbine components (see, for example, JP-A-2014-074406).

SUMMARY OF THE INVENTION

The seal plate does not completely seal the gap between turbine components. The seal plate causes a micro leak of the low temperature fluid to occur between the turbine components and the leak air is used for cooling the seal plate and turbine components. A need, however, exists for even higher temperature of the combustion gas in power generation gas turbines on which a great deal of expectation is placed for the combined cycle. Thus, an urgent need is to improve sealing performance and cooling performance of the gap between the turbine components. An anterior edge portion of end walls of turbine nozzles in a first stage, at which a gap exists from a transition piece, needs to be cooled since the anterior edge is located near the combustor in which the temperature of the combustion gas has is high. However, due to the anterior edge portion being thin, it is difficult to apply a cooling structure in addition to a seal structure. This imposes a problem particularly on small-and-medium-sized gas turbines that are required to incorporate more compact components.

It is an object of the present invention to provide a gas turbine capable of effectively cooling, while sealing, a gap between a combustor transition piece and a turbine nozzle.

To achieve the foregoing object, an aspect of the present invention provides a gas turbine that includes a compressor that compresses air; a combustor that burns compressed air compressed by the compressor with fuel to thereby generate combustion gas; and a turbine driven by the combustion gas generated by the combustor. The combustor includes a transition piece that supplies the turbine with the combustion gas. The turbine includes at least one turbine stage that includes one nozzle cascade and one blade cascade arranged in sequence from an upstream side along a turbine axial direction. Nozzle end walls that define inner and outer peripheries of an annular combustion gas flow passage in the nozzle cascade in a first turbine stage have anterior edges facing a posterior edge of the transition piece in the turbine axial direction across gaps that are sealed by seal members. In the gas turbine described above, the transition piece has flange portions that extend in a turbine radial direction. The flange portions are disposed on an inner peripheral wall and an outer peripheral wall of a combustion gas outlet portion at surfaces opposite to the combustion gas flow passage. The nozzle end walls have seal grooves in surfaces thereof facing the transition piece. The seal grooves extend in the turbine axial direction. The seal members each include a hook portion and a seal plate portion. The hook portion embraces the flange portion of the transition piece so as to slide in the turbine radial direction along the flange portion and the seal plate portion is inserted in the seal groove in the nozzle end wall. The seal groove and the seal plate portion are configured to include a surface contact region in which a high temperature-side inner wall surface closer to the combustion gas flow passage of the seal groove and the seal plate portion are in surface contact with each other, a non-contact region disposed on a side closer to the transition piece than the surface contact region and having a gap interposed between the high temperature-side inner wall surface and a surface facing the seal plate portion, and a through hole provided at the seal plate portion so as to face the high temperature-side inner wall surface in the seal groove across the gap in the non-contact region.

The present invention can effectively cool, while sealing, the gap between the combustor transition piece and the turbine nozzle.

DESCRIPTION OF THE PREFERRED EMBODIMENT

Specific embodiments to which the present invention is applied will be described below with reference to the accompanying drawings.

First Embodiment

1. Gas Turbine

Figure 1:
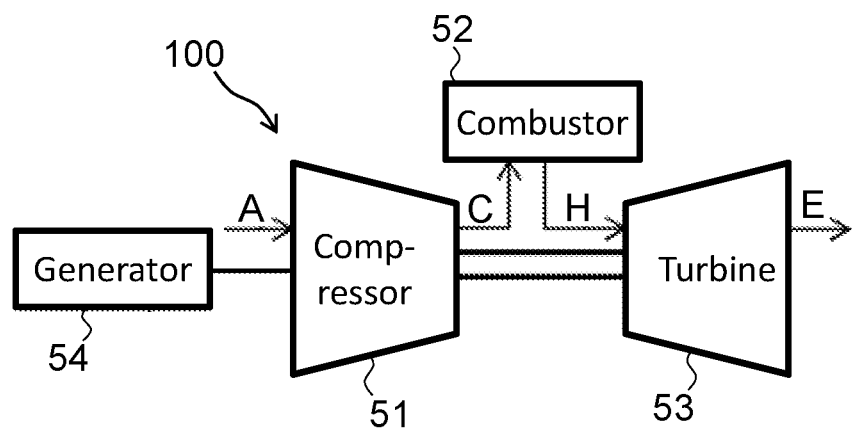
FIG. 1 is a schematic view of a gas turbine.

FIG. 1 is a schematic view of a gas turbine. This gas turbine 100 shown in FIG. 1 may have a relatively large size, but is here assumed to have a relatively small size smaller than a medium size. The gas turbine 100 includes a compressor 51, a combustor 52, and a turbine 53. The compressor 51 compresses air A drawn in via an intake part to thereby generate compressed air C at high pressure. The compressor 51 supplies the compressed air C to the combustor 52. The combustor 52 burns the compressed air C compressed by the compressor 51 with fuel to thereby generate combustion gas H at high temperature. The combustor 52 then supplies the combustion gas H to the turbine 53. The turbine 53 is driven by the combustion gas H generated by the combustor 52. The compressor 51 and the turbine 53 are coaxially coupled to each other. In addition, a load device (a generator 54 in the present embodiment) is coupled to the compressor 51 or the turbine 53. Rotational drive power acquired by the turbine 53 is used partly as drive power for the compressor 51 and partly as drive power for the generator 54. The combustion gas H that has driven the turbine 53 is discharged as exhaust gas E from the turbine 53.

Figure 2:
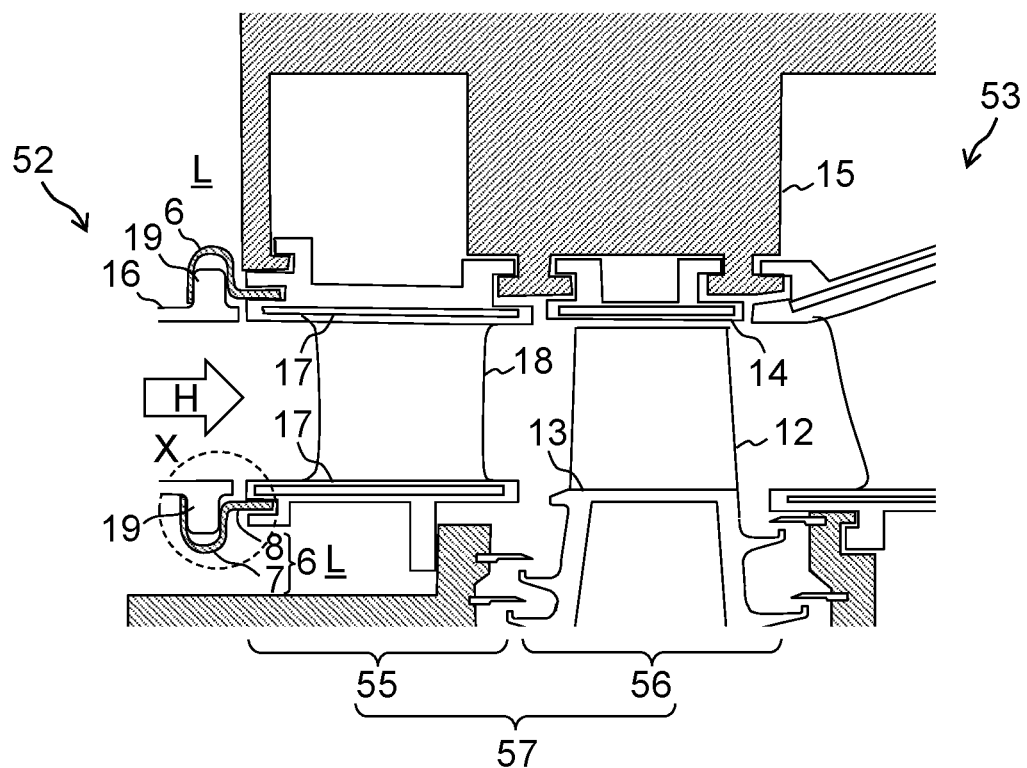
FIG. 2 is a partial cross-sectional schematic view of a connection between a combustor and a turbine according to a first embodiment of the present invention.

FIG. 2 is a partial cross-sectional schematic view of a connection between the combustor and the turbine. As shown in FIG. 2, the combustor 52 includes a transition piece 16 for supplying the turbine 53 with the combustion gas H. The turbine 53 includes at least one turbine stage 57 that includes one nozzle cascade 55 and one blade cascade 56 arranged in sequence from an upstream side along a turbine axial direction. The present embodiment describes a case where a plurality of turbine stages 57 are provided. Although the description is made with the nozzle cascade 55 and the blade cascade 56, to which reference characters are assigned, in a first stage of the turbine stage 57, it is noted that nozzle cascades and blade cascades in a second stage and onward are configured in a similar manner.

The nozzle cascade 55 includes a plurality of nozzles arranged in a turbine rotating direction and divided into a plurality of segments in the turbine rotating direction. Similarly, the blade cascade 56 includes a plurality of blades arranged in the turbine rotating direction and divided into a plurality of segments in the turbine rotating direction. One segment of the nozzle cascade 55 includes two nozzle end walls 17 and at least one airfoil 18. The nozzle end walls 17 are thin plate-shaped members defining inner and outer peripheries of a combustion gas flow passage (annular flow passage through which the combustion gas H flows) in the cascade in question. The airfoil 18 functions to smooth the combustion gas H. The airfoil 18 extends in a turbine radial direction to couple the nozzle end walls 17 on the inner and outer peripheries. The nozzle cascade 55 is fixed to a turbine casing 15 by the nozzle end wall 17 on the outer peripheral side being engaged with the turbine casing 15. The blade cascade 56 includes a plurality of blades 12 disposed on an outer peripheral portion of a disc 13. An annular combustion gas flow passage in the blade cascade 56 is defined by a shroud 14 on the outer peripheral side and by an outer peripheral surface of the disc 13 on the inner peripheral side. The shroud 14 is divided into a plurality of segments in the turbine rotating direction. Each of the segments is fixed to the turbine casing 15. As shown in FIG. 2, anterior edges of the nozzle end walls 17 on the inner and outer peripheries of the nozzle cascade 55 in the turbine first stage and a posterior edge of the transition piece 16 face each other across a gap in the turbine axial direction. The gap between the posterior edge of the transition piece 16 and the anterior edges of the nozzle end walls 17 is sealed by a seal member 6.

2. Seal Structure

The transition piece 16 has flange portions 19 extending in the turbine radial direction. The flange portions 19 are disposed on surfaces of an inner peripheral wall and an outer peripheral wall of a combustion gas outlet portion (portion opposed to the nozzle end walls 17) opposite to the combustion gas flow passage. The flange portion 19 on the outer peripheral wall of the transition piece 16 (wall surface on the outer peripheral side in the turbine radial direction) protrudes from the outer peripheral wall outwardly in the turbine radial direction. The flange portion 19 on the inner peripheral wall of the transition piece 16 (wall surface on the inner peripheral side in the turbine radial direction) protrudes from the inner peripheral wall inwardly in the turbine radial direction. A surface of the flange portion 19 facing one side in the turbine axial direction (surface on the left side in FIG. 2) extends in parallel with a surface facing the other side in the turbine axial direction (surface on the right side in FIG. 2).

Figure 3:
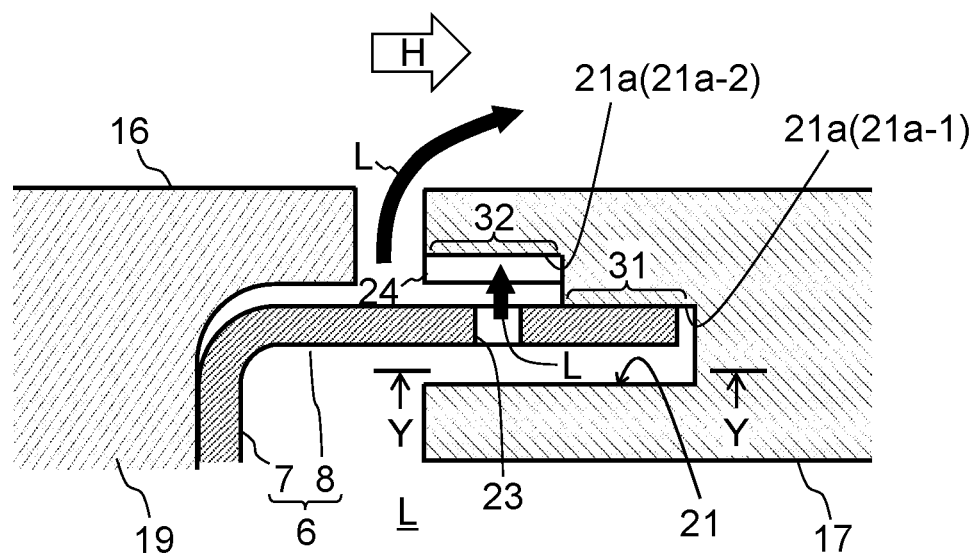
FIG. 3 is an enlarged view of portion X encircled by a broken line in FIG. 2.
Figure 4:
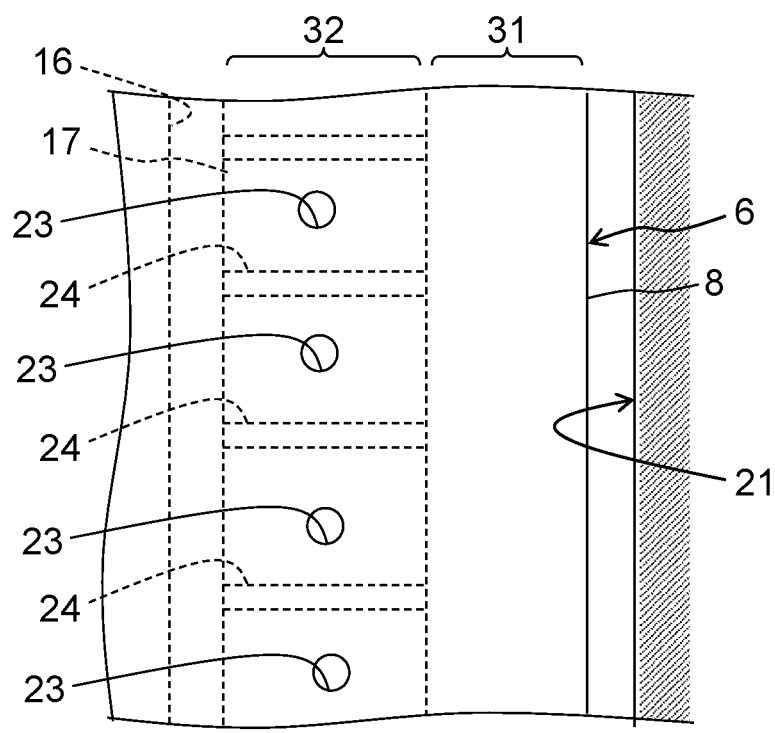
FIG. 4 is a cross-sectional view taken along arrowed line Y-Y in FIG. 3.

FIG. 3 is an enlarged view of portion X encircled by a broken line in FIG. 2. FIG. 4 is a cross-sectional view taken along arrowed line Y-Y in FIG. 3. FIGS. 3 and 4 show a portion in which the posterior edge of the transition piece 16 and the anterior edge of the nozzle end wall 17 face each other on the inner peripheral side of the combustion gas flow passage. The same configuration applies to a portion in which the transition piece 16 and the nozzle end wall 17 face each other on the outer peripheral side of the combustion gas flow passage.

In FIGS. 3 and 4, the nozzle end walls 17 define the inner and outer peripheries of the combustion gas flow passage as described previously. The nozzle end walls 17 are disposed so as to shield the combustion gas flow passage through which the combustion gas H at high temperature flows, from a region outside the combustion gas flow passage in which a low-temperature fluid L is supplied. The nozzle end walls 17 have seal grooves 21 in surfaces thereof facing the transition piece 16. The seal groove 21 extends in the turbine axial direction and is formed annularly and concentrically with the nozzle end walls 17 as viewed from the turbine axial direction.

The seal member 6 described above is a member formed, for example, by bending sheet stock. The seal member 6 includes a hook portion 7 and a seal plate portion 8. The hook portion 7 is a portion that has been bent into a U-shape to extend along the flange portion 19 of the transition piece 16 toward the combustion gas flow passage. The hook portion 7 embraces the flange portion 19 of the transition piece 16 so as to slide along the flange portion 19. The hook portion 7 has inner wall surfaces that face respective surfaces of the flange portion 19, facing in the turbine axial direction. The inner wall surfaces contact the respective surfaces of the flange portion 19 or have a slight gap interposed therebetween. The seal plate portion 8 extends from a posterior edge of the hook portion 7 toward the nozzle end wall 17 in the turbine axial direction. The seal plate portion 8 is inserted in the seal groove 21 in the nozzle end wall 17 to thereby extend across the gap between the transition piece 16 and the nozzle end wall 17. This allows the hook portion 7 of the seal member 6 to seal the area around the flange portion 19 of the transition piece 16 and the seal plate portion 8 to seal the gap between the transition piece 16 and the nozzle end wall 17.

In the present embodiment, the seal groove 21 and the seal plate portion 8 are configured so as to include a surface contact region 31 and a non-contact region 32. The surface contact region 31 is a region in which a high temperature-side inner wall surface 21a as an inner wall surface on a side (upper side in FIG. 3) closer to the combustion gas flow passage of the seal groove 21 and the seal plate portion 8 are in surface contact with each other. The non-contact region 32 is disposed on a side (left side in FIG. 3) closer to the transition piece 16 than the surface contact region 31 is. The non-contact region 32 has a gap interposed between the high temperature-side inner wall surface 21a and a surface facing the seal plate portion 8. In the present embodiment, the high temperature-side inner wall surface 21a of the seal groove 21 has a step. In a cross-sectional view extending in the turbine radial direction as shown in FIG. 3, a high temperature-side inner wall surface (cooling surface) 21a-2 of the non-contact region 32 is closer to the combustion gas flow passage than a high temperature-side inner wall surface (touch surface) 21a-1 of the surface contact region 31 is. In contrast, the seal plate portion 8 extends, in the same cross-sectional view, across the gap between the transition piece 16 and the nozzle end wall 17 linearly in the turbine axial direction up to the surface contact region 31. Thus, the seal member 6 receives pressure of the low-temperature fluid L on a surface thereof (lower surface in FIG. 3) remote from the combustion gas flow passage to thereby be urged toward the combustion gas flow passage. Even under a condition in which the seal plate portion 8 is in surface contact with the high temperature-side inner wall surface 21a-1 in the surface contact region 31, a gap is available between the seal plate portion 8 and the high temperature-side inner wall surface 21a-2 in the non-contact region 32. A distance between the high temperature-side inner wall surface 21a-2 in the seal groove 21 in the non-contact region 32 and the seal plate portion 8 (to state the foregoing differently, a dimension of the step between the high temperature-side inner wall surfaces 21a-1 and 21a-2) is, for example, 0.5 to five times as large as the diameter of a through hole 23.

The seal plate portion 8 has the through hole 23 formed so as to face the high temperature-side inner wall surface 21a-2 in the seal groove 21 across the gap in the non-contact region 32. At least one through hole 23 is formed in each segment of the nozzle end walls 17. The gap in the non-contact region 32 is formed annularly and concentrically with the nozzle end walls 17 as viewed from the turbine axial direction. Thus, a plurality of through holes 23 are formed in the turbine rotating direction.

Additionally, in the present embodiment, a turbulence promoting member 24 is disposed on the non-contact region 32. The turbulence promoting member 24 is a rib extending in the turbine axial direction. As shown in FIG. 4, in the present embodiment, the turbulence promoting members 24 and the through holes 23 are alternately disposed in the turbine rotating direction. In addition, the turbulence promoting members 24 are each disposed in a protruding condition from the high temperature-side inner wall surface 21a-2 of the non-contact region 32 in the seal groove 21. The turbulence promoting member 24 has a dimension in the turbine radial direction set such that a gap is allowed between the seal plate portion 8 and the turbulence promoting member 24 even under a condition in which the seal plate portion 8 is in contact with the high temperature-side inner wall surface 21a-1 of the surface contact region 31. Additionally, although no specific dimension is specified for a dimension of the turbulence promoting member 24 in the turbine axial direction, the turbulence promoting member 24 has the dimension that matches a dimension of the non-contact region 32 in the turbine axial direction in the present embodiment, so that the turbulence promoting member 24 extends from the anterior edge of the nozzle end wall 17 up to the surface contact region 31.

3. Operation

During gas turbine operation, part of the compressed air is extracted as the low-temperature fluid L from a compressed air flow passage (not shown) in the compressor 51 and supplied to different parts as seal air or cooling air. A space around the transition piece 16 also receives the compressed air that is delivered from, for example, an outlet of the compressor 51 and supplied thereto as the low-temperature fluid L at high pressure. When the low-temperature fluid L is supplied to the space around the transition piece 16, a difference in pressure between the outside and inside of the combustion gas flow passage urges the seal member 6 toward the combustion gas flow passage side. As a result, the hook portion 7 slides in the turbine radial direction with respect to the flange portion 19 of the transition piece 16. This moves the seal plate portion 8 in the turbine radial direction to bring the seal plate portion 8 into contact with the high temperature-side inner wall surface 21a-1 of the surface contact region 31 in the seal groove 21. In addition, part of the low-temperature fluid L jets via the through hole 23 to collide against the high temperature-side inner wall surface 21a-2 of the non-contact region 32 opposed thereto before flowing into the combustion gas flow passage by way of a portion at which the transition piece 16 faces the nozzle end walls 17.

4. Effects

In the present embodiment, the seal plate portion 8 is in contact with the high temperature-side inner wall surface 21a-1 of the surface contact region 31 in the seal groove 21 to thereby extend across opposing portions of the transition piece 16 and the nozzle end walls 17. This prevents an excessive amount of the low-temperature fluid L from flowing in the combustion gas flow passage existing between the opposing portions of the transition piece 16 and the nozzle end walls 17. Thus, the combustion gas temperature can be prevented from being excessively reduced.

In addition, a portion of the nozzle end wall 17 closer to the combustion gas flow passage side than the seal plate portion 8 is spaced away from the flow of the low-temperature fluid L by the seal plate portion 8. Moreover, routing a cooling flow passage inside the nozzle end wall 17 is difficult because of the thin-walled nozzle end wall 17. Thus, effective cooling of this portion is originally difficult without the through hole 23, despite the requirement for cooling of this portion that is exposed to the combustion gas flow passage. In contrast, the present embodiment has a configuration in which the seal groove 21 has the surface contact region 31 and the non-contact region 32 thereinside and, due to differential pressure involved between the combustion gas H and the low-temperature fluid L, the low-temperature fluid L jets out via the through hole 23 to collide against the high temperature-side inner wall surface 21a-2 of the non-contact region 32 before flowing into the combustion gas flow passage. This arrangement enables effective cooling of a high-temperature portion, which is hard to be cooled, of the nozzle end wall 17.

The flow rate of the low-temperature fluid L that flows past the through hole 23 can be set by the diameter of the through hole 23 and the number of the through holes 23. The low-temperature fluid L having a flow rate only required for cooling the nozzle end wall 17 can thus be made to join the combustion gas flow passage.

Additionally, the low-temperature fluid L that has jetted out from the through hole 23, when flowing to the combustion gas flow passage by way of the opposing portions of the transition piece 16 and the nozzle end walls 17, is subjected to force from the combustion gas H having large momentum and thus flows near wall surfaces of the nozzle end walls 17. A film cooling effect can thereby be expected.

Figure 5:
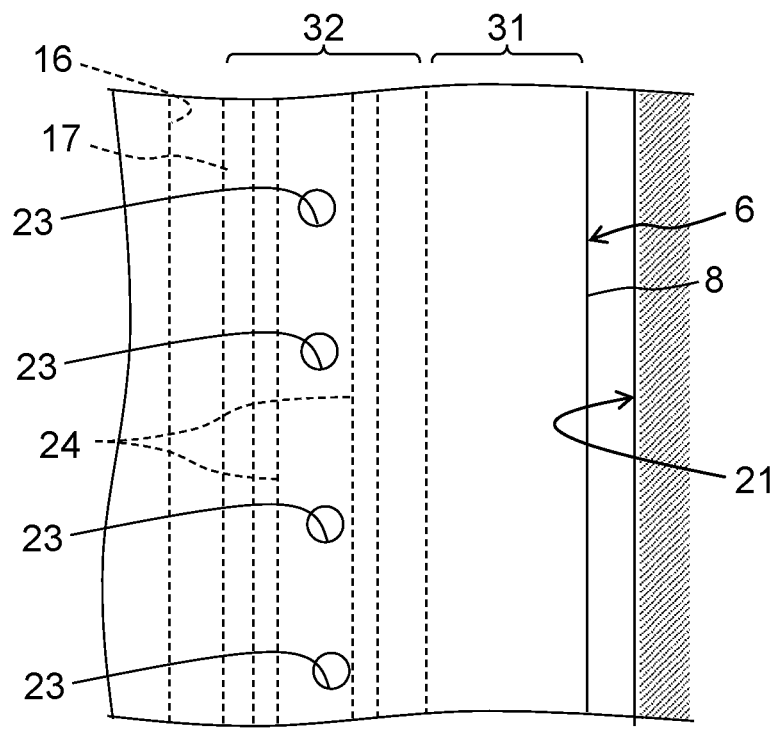
FIG. 5 is a view showing a seal structure in a gas turbine having another configuration according to the first embodiment of the present invention, corresponding to FIG. 3.

The turbulence promoting member 24 provided in the non-contact region 32 as in the present embodiment can further improve a heat transfer coefficient of the low-temperature fluid L with respect to the nozzle end wall 17. The use of a rib extending in the turbine axial direction for the turbulence promoting member 24 as shown in FIG. 4 is illustrative only and not limiting. The same effect can be expected from, for example, a rib extending in the turbine rotating direction used for the turbulence promoting member 24 as shown in FIG. 5.

Second Embodiment

Figure 6:
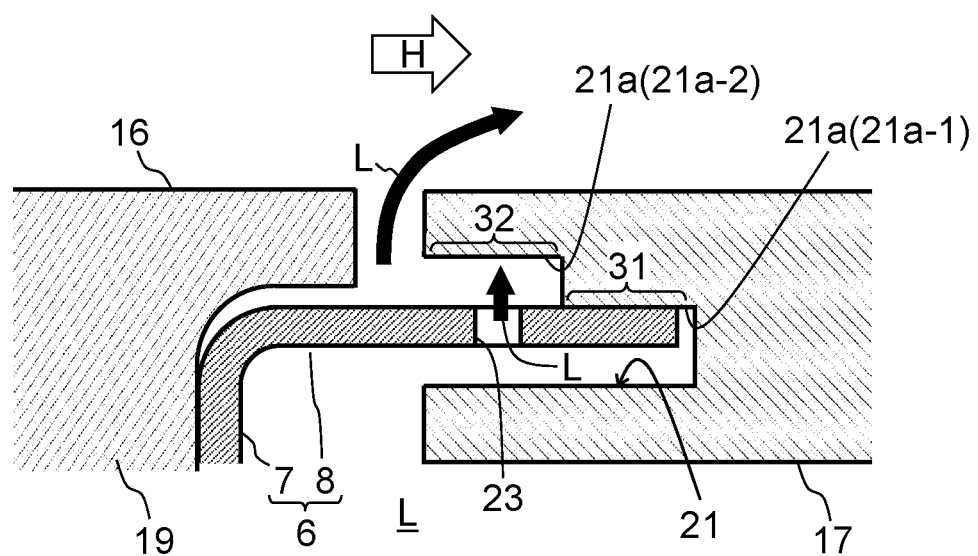
FIG. 6 is a view showing a seal structure in a gas turbine according to a second embodiment of the present invention, corresponding to FIG. 3.

FIG. 6 is a view showing a seal structure in a gas turbine according to a second embodiment of the present invention. FIG. 6 corresponds to FIG. 3 that depicts the first embodiment. The present embodiment differs from the first embodiment in that the turbulence promoting member 24 is omitted. The present embodiment has configurations that are otherwise similar to the configurations of the first embodiment. The configurations of the present embodiment are applicable, if the cooling effect by the collision of the low-temperature fluid L jetted out from the through hole 23 against the high temperature-side inner wall surface 21a-2 is sufficient enough, without requiring the turbulence promoting member 24 for thermal load by the combustion gas H.

Third Embodiment

Figure 7:
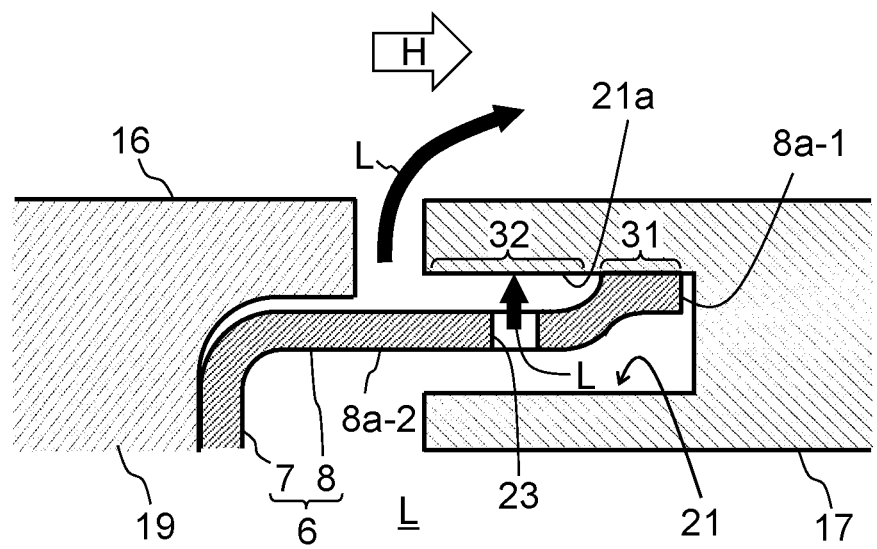
FIG. 7 is a view showing a seal structure in a gas turbine according to a third embodiment of the present invention, corresponding to FIG. 3.

FIG. 7 is a view showing a seal structure in a gas turbine according to a third embodiment of the present invention. FIG. 7 corresponds to FIG. 3 that depicts the first embodiment. The present embodiment differs from the first embodiment in that a seal plate portion 8 of a seal member 6 is bent as viewed from the turbine rotating direction and that the turbulence promoting member 24 is omitted. The present embodiment has configurations that are otherwise similar to the configurations of the first embodiment.

The present embodiment includes a surface contact portion 8a-1 that constitutes a surface contact region 31 and a non-contact portion 8a-2 that constitutes a non-contact region 32. In the present embodiment, a high temperature-side inner wall surface 21a in a seal groove 21 has no step as viewed from the turbine rotating direction and extends flatly in the turbine axial direction, so that the surface contact portion 8a-1 makes a surface contact with the high temperature-side inner wall surface 21a. The non-contact portion 8a-2 is disposed on the side closer to a transition piece 16 than the surface contact portion 8a-1 is. The non-contact portion 8a-2 thus forms a step by being spaced away from the combustion gas flow passage relative to the surface contact portion 8a-1. The seal plate portion 8 is bent by, for example, presswork. In the present embodiment, the foregoing arrangement results in a gap being interposed at the non-contact region 32 between the high temperature-side inner wall surface 21a and the seal plate portion 8. A through hole 23 is formed in the non-contact portion 8a-2 of the seal plate portion 8.

Figure 8:
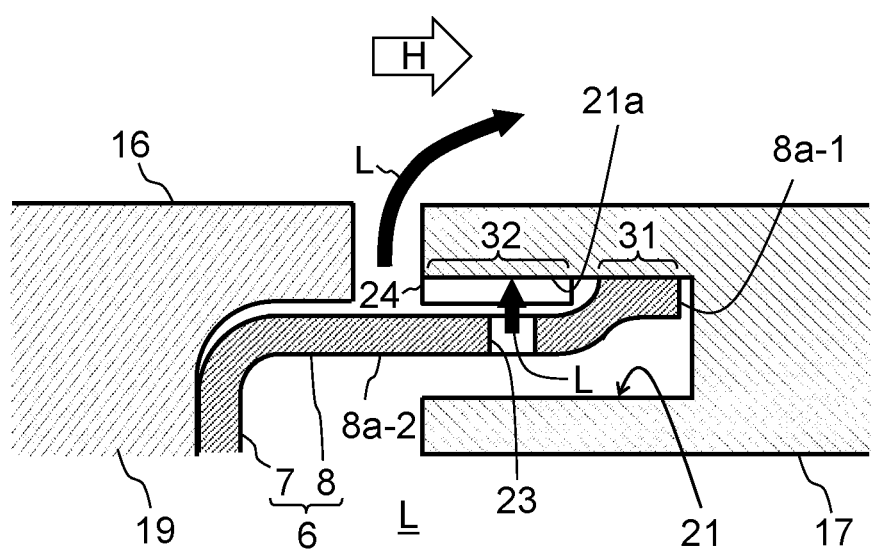
FIG. 8 is a view showing a seal structure in a gas turbine having another configuration according to the third embodiment of the present invention, corresponding to FIG. 3.

In the first and second embodiments, a step is formed in the high temperature-side inner wall surface 21a in the seal groove 21 to thereby form the surface contact region 31 and the non-contact region 32. The surface contact region 31 and the non-contact region 32 may, however, be formed by, as in the present embodiment, bending the seal plate portion 8 instead of (or in addition to) having the step in the high temperature-side inner wall surface 21a. Additionally, while FIG. 7 illustrates an exemplary configuration omitting the turbulence promoting member 24, understandably, the turbulence promoting member 24 may be applied to the high temperature-side inner wall surface 21a of the non-contact region 32 in the present embodiment, too, as shown in FIG. 8. The effects achieved by the first and second embodiments can be achieved also in the present embodiment.

Fourth Embodiment

Figure 9:
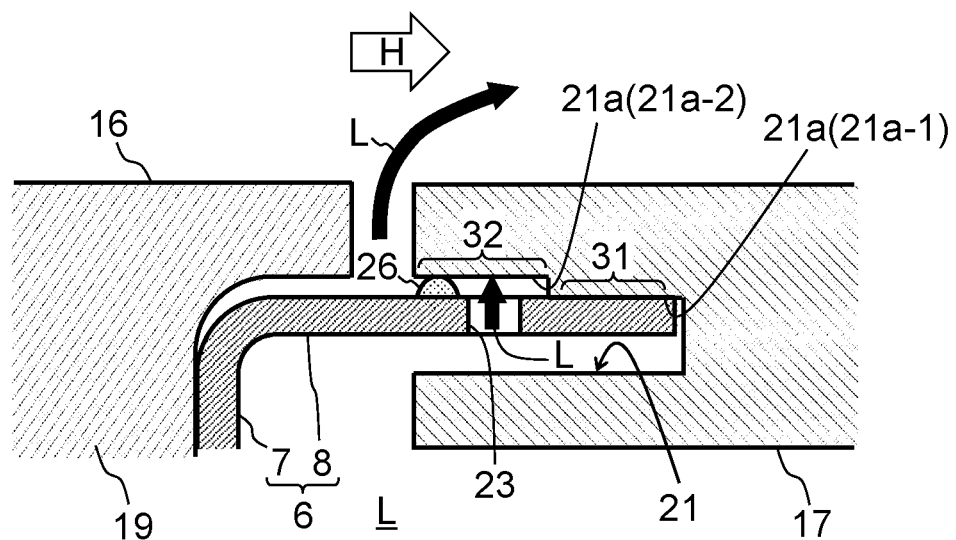
FIG. 9 is a view showing a seal structure in a gas turbine according to a fourth embodiment of the present invention, corresponding to FIG. 3.

FIG. 9 is a view showing a seal structure in a gas turbine according to a fourth embodiment of the present invention. FIG. 9 corresponds to FIG. 3 that depicts the first embodiment. The present embodiment differs from the first embodiment in that a protrusion 26 is disposed at a non-contact region 32 and that the turbulence promoting member 24 is omitted. The present embodiment has configurations that are otherwise similar to the configurations of the first embodiment.

Figure 10:
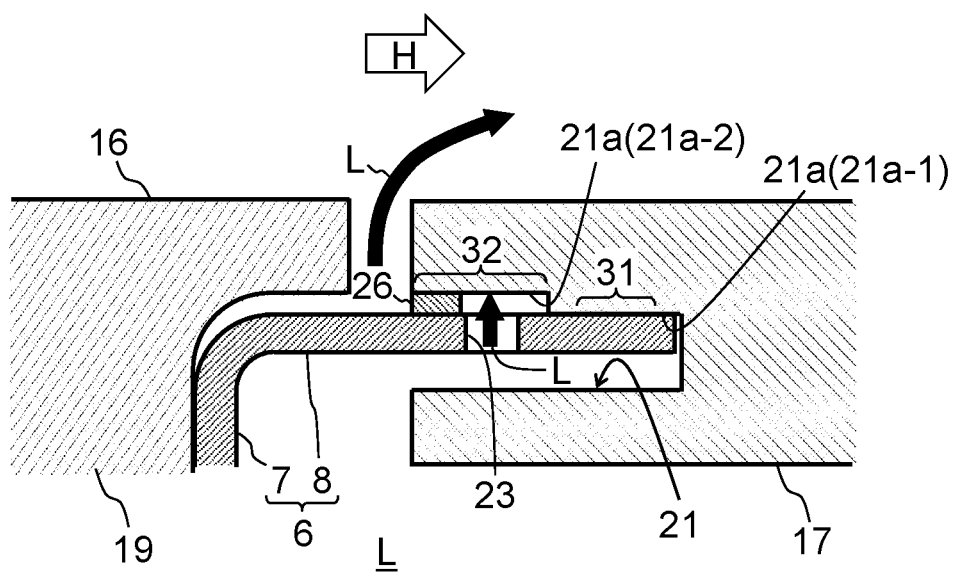
FIG. 10 is a view showing a seal structure in a gas turbine having another configuration according to the fourth embodiment of the present invention, corresponding to FIG. 3.

The protrusion 26 has a dimension in the turbine radial direction set to match a distance between a high temperature-side inner wall surface 21a-2 of a seal groove 21 in the non-contact region 32 and a seal plate portion 8. The protrusion 26 is disposed on the side closer to a transition piece 16 than the through hole 23 is. A plurality of protrusions 26 are disposed in the turbine rotating direction, each being spaced apart from each other. In the present embodiment, the through hole 23 and the protrusion 26 are disposed at positions corresponding to each other in the turbine rotating direction. The positional relation between the through hole 23 and the protrusion 26 is, however, illustrative only and not limiting. Additionally, the protrusion 26 is disposed on a surface of the seal plate portion 8 facing the high temperature-side inner wall surface 21a-2. The protrusion 26 may nonetheless be disposed on an inner wall surface of the high temperature-side inner wall surface 21a-2 facing the seal plate portion 8. The protrusion 26 is formed into a conical shape or a chevron shape having a smooth curved surface at a leading end portion. The leading end portion is configured to make a point contact with an opposing surface (high temperature-side inner wall surface 21a-2 in the present embodiment). Another possible configuration is a columnar protrusion 26 that has a leading end surface and an upper surface that extend in parallel with each other as shown in FIG. 10 and in which the leading end surface makes a surface contact with the opposing surface (high temperature-side inner wall surface 21a-2 in FIG. 10).

In the present embodiment, in addition to effects similar to the effects achieved by each of the foregoing embodiments, a gap between the seal plate portion 8 and the high temperature-side inner wall surface 21a-2 can be prevented from being changed thanks to the protrusion 26 that serves a role of a spacer. Thus, variations in the heat transfer coefficient in cooling by a low-temperature fluid L that jets out from the through hole 23 can be reduced. Additionally, an effect of improved cooling effect can be expected from the turbulence promoting effect by the protrusion 26, similar to the cooling effect achieved by the provision of the turbulence promoting member 24. For turbulence promotion, a greater effect can be expected in the example shown in FIG. 10 than in the example shown in FIG. 9. Additionally, an even greater turbulence promoting effect can be expected from the positions of the through hole 23 and the protrusion 26 corresponding to each other in the turbine rotating direction.

(Miscellaneous)

It should be understood that each of these embodiments and modifications thereof may be combined with any of the others. While the embodiments have been described for an exemplary configuration in which the non-contact region 32 and the through hole 23 are disposed only at a portion at which the high temperature-side inner wall surface 21a of the seal groove 21 faces the seal plate portion 8, a configuration is possible in which the non-contact region 32 and the through hole 23 are added to a portion at which the transition piece 16 faces the seal plate portion 8. In addition, although an exemplary single-shaft gas turbine has been illustrated with reference to FIG. 1, similar effects can be obtained through application of the present invention to connections between the transition pieces and the nozzle end walls in different types of gas turbines. To apply the present invention to a two-shaft gas turbine including a high-pressure turbine coupled to a compressor and a low-pressure turbine coupled to a load device separated from the high-pressure turbine, the present invention may be applied to the connection between the transition piece and the first stage nozzle end walls of the high-pressure turbine.

What is claimed is:

1. A gas turbine, comprising:
    a compressor that compresses air;
    a combustor that burns the air compressed by the compressor with a fuel to thereby generate a combustion gas; and
    a turbine driven by the combustion gas generated by the combustor;
    the combustor including a transition piece that supplies the turbine with the combustion gas;
    the turbine including:
        a first turbine stage that includes a nozzle cascade and a blade cascade arranged in sequence along a turbine axial direction;
        an inner nozzle end wall and an outer nozzle end wall that define respective inner and outer peripheries of an annular combustion gas flow passage in the nozzle cascade of the first turbine stage, the inner nozzle end wall and the outer nozzle end wall each having an anterior edge facing a posterior edge of the transition piece;
        a first gap between the anterior edge of the inner nozzle end wall and the posterior edge of the transition piece, and a second gap between the anterior edge of the outer nozzle end wall and the posterior edge of the transition piece, and
    at least one of a first seal member and a second seal member, wherein the first seal member seals the first gap and the second seal member seals the second gap,
    wherein the transition piece has a first flange portion and a second flange portion that extend in a turbine radial direction, the first flange portion being disposed on an inner peripheral wall portion of a combustion gas outlet of the transition piece, and the second flange portion being disposed on an outer peripheral wall portion of the combustion gas outlet of the transition piece, the outer peripheral wall portion located radially outward, with respect to the longitudinal axis, of the inner peripheral wall portion,
    wherein anterior edges of each of the inner nozzle end wall and the outer nozzle end wall each have a respective seal groove, each seal groove extending in the turbine axial direction,
    wherein each seal groove includes a high temperature-side inner wall surface and a low temperature-side outer wall surface, wherein the high temperature-side inner wall surface of each seal groove is located closer to the annular combustion gas flow passage than the low temperature-side outer wall surface of the respective seal groove,
    wherein the first and second seal members each include a hook portion and a seal plate portion, the hook portion of the first seal member embracing the first flange portion so as to slide in the turbine radial direction along the first flange portion and the seal plate portion of the first seal member being inserted in the seal groove of the inner nozzle end wall when the first gap is sealed by the first seal member, and the hook portion of the second seal member embracing the second flange portion so as to slide in the turbine radial direction along the second flange portion, the seal plate portion of the second seal member being inserted in the seal groove of the outer nozzle end wall when the second gap is sealed by the second seal member,
    wherein the seal groove and the seal plate portion are configured to include:
        a first surface contact region at which a first portion of the high temperature-side inner wall surface of the seal groove of the inner nozzle end wall and the seal plate portion of the first seal member are in surface contact with each other when the first gap is sealed by the first seal member,
        a first non-contact region disposed closer to the transition piece than the first surface contact region, the first non-contact region having a third gap interposed between a second portion of the high temperature-side inner wall surface of the inner nozzle end wall and the seal plate portion of the first seal member, and
        a first through hole provided through the seal plate portion of the first seal member opposite the second portion of the high temperature-side inner wall of the seal groove of the inner nozzle end wall, and wherein
    the seal groove of the outer nozzle end wall and the seal plate portion of the second seal member are configured to include:
        a second surface contact region at which a first portion of the high temperature-side inner wall surface of the seal groove of the outer nozzle end wall and the seal plate portion of the second seal member are in surface contact with each other, a second non-contact region disposed closer to the transition piece than the second surface contact region, the second non-contact region having a fourth gap interposed between a second portion of the high temperature-side inner wall surface of the outer nozzle end wall and the seal plate portion of the second seal member, and a second through hole provided through the seal plate portion of the second seal member opposite the second portion of the high temperature-side inner wall surface of the seal groove of the outer nozzle end wall.

2. The gas turbine according to claim 1, wherein the second portion of the high temperature-side inner wall surface of the seal groove of the inner nozzle end wall is closer to the annular combustion gas flow passage than the first portion of the high temperature-side inner wall surface of the seal groove of the inner nozzle end wall, and wherein the second portion of the high temperature-side inner wall surface of the seal groove of the outer nozzle end wall is closer to the annular combustion gas flow passage than the first portion of the high temperature-side inner wall surface of the seal groove of the outer nozzle end wall.

3. The gas turbine according to claim 1, wherein the seal plate portion of the first seal member has a bend such that a first sub-portion of the seal plate portion of the first seal member constituting the non-contact region is spaced away from the annular combustion gas flow passage relative to a second sub-portion of the seal plate portion of the first seal member constituting the surface contact region, and wherein the seal plate portion of the second seal member has a bend such that a first sub-portion of the seal plate portion of the second seal member constituting the non-contact region is spaced away from the annular combustion gas flow passage relative to the second sub-portion of the seal plate portion of the second seal member constituting the surface contact region.

4. The gas turbine according to claim 1, wherein a first turbulence promoting member is disposed on the second portion of the high temperature-side inner wall surface of the seal groove of the inner nozzle end wall in the non-contact region, and wherein a second turbulence promoting member is disposed on the second portion of the high temperature-side inner wall surface of the seal groove of the outer nozzle end wall in the non-contact region.

5. The gas turbine according to claim 4, wherein the first turbulence promoting member is a rib extending in the turbine axial direction, and wherein the second turbulence promoting member is a rib extending in the turbine axial direction.

6. The gas turbine according to claim 4, wherein the first turbulence promoting member is a rib extending in a turbine rotating direction, and wherein the second turbulence promoting member is a rib extending in the turbine rotating direction.

7. The gas turbine according to claim 1, wherein a first protrusion is disposed on the seal plate portion of the first seal member in the non-contact region, the first protrusion having a dimension in the turbine radial direction set to match a distance across the third gap, and wherein a second protrusion is disposed on the seal plate portion of the second seal member in the non-contact region, the second protrusion having a dimension in the turbine radial direction set to match a distance across the fourth gap.

8. The gas turbine according to claim 7, wherein the first protrusion has a leading end portion in point contact with the second portion of the high temperature-side inner wall surface of the seal groove of the inner nozzle end wall, and wherein the second protrusion has a leading end portion in point contact with the second portion of the high temperature-side inner wall surface of the seal groove of the outer nozzle end wall.

9. The gas turbine according to claim 7, wherein the first protrusion has a leading end portion in surface contact with the second portion of the high temperature-side inner wall surface of the seal groove of the inner nozzle end wall, and wherein the second protrusion has a leading end portion in surface contact with the second portion of the high temperature-side inner wall surface of the seal groove of the outer nozzle end wall.

10. The gas turbine according to claim 7, wherein the first protrusion and the first through hole are disposed at respective positions that correspond to each other in the turbine rotating direction, and wherein the second protrusion and the second through hole are disposed at respective positions that correspond to each other in the turbine rotating direction.

11. The gas turbine according to claim 1, wherein a distance across the third gap in the turbine radial direction is 0.5 to five times as large as a diameter of the first through hole, and wherein a distance across the fourth gap in the turbine radial direction is 0.5 to five times as large as a diameter of the second through hole.

* * * * *